(12) United States Patent
Zeng

(10) Patent No.: US 11,249,645 B2
(45) Date of Patent: Feb. 15, 2022

(54) APPLICATION MANAGEMENT METHOD, STORAGE MEDIUM, AND ELECTRONIC APPARATUS

(71) Applicant: GUANGDONG OPPO MOBILE TELECOMMUNICATIONS CORP., LTD., Guangdong (CN)

(72) Inventor: Yuanqing Zeng, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 139 days.

(21) Appl. No.: 16/824,512

(22) Filed: Mar. 19, 2020

(65) Prior Publication Data

US 2020/0218456 A1 Jul. 9, 2020

Related U.S. Application Data

(63) Continuation of application No. PCT/CN2018/100684, filed on Aug. 15, 2018.

(30) Foreign Application Priority Data

Sep. 30, 2017 (CN) .......................... 201710940338.9

(51) Int. Cl.
*G06F 3/06* (2006.01)
*G06F 17/16* (2006.01)
*G06N 3/08* (2006.01)

(52) U.S. Cl.
CPC .......... *G06F 3/0608* (2013.01); *G06F 3/0604* (2013.01); *G06F 3/0673* (2013.01); *G06F 17/16* (2013.01); *G06N 3/08* (2013.01)

(58) Field of Classification Search
None
See application file for complete search history.

(56) References Cited

U.S. PATENT DOCUMENTS 10,659,260 B2 * 5/2020 Hu ........................... G06F 17/16
11,106,976 B2 * 8/2021 Flamant ................. G06N 3/084
(Continued)

FOREIGN PATENT DOCUMENTS

CN 103646086 A 3/2014
CN 105224408 A 1/2016
(Continued)

OTHER PUBLICATIONS

English translation of the Notification to Grant Patent Right for Invention from China patent office in a counterpart Chinese Application No. 201 710940338.9, dated Jun. 2, 2020 (7 pages).
(Continued)

*Primary Examiner* — Elias Mamo
(74) *Attorney, Agent, or Firm* — Young Basile Hanlon & MacFarlane, P.C.

(57) ABSTRACT

Provided are an application management method, a storage medium, and an electronic apparatus. The method includes: collecting a plurality of characteristic information of an application; learning the plurality of characteristic information to obtain a self-organizing neural network model of the application; calculating a first characteristic coefficient of the application; determining a second characteristic coefficient from the characteristic coefficient matrix according to the first characteristic coefficient; and judging whether the application can be cleaned up according to the second characteristic coefficient.

20 Claims, 7 Drawing Sheets

(56) References Cited

U.S. PATENT DOCUMENTS

| | | | | |
|---|---|---|---|---|
| 2015/0134583 | A1* | 5/2015 | Tamatsu | G06N 3/08 |
| | | | | 706/25 |
| 2019/0095250 | A1* | 3/2019 | Qiang | G06F 9/50 |

FOREIGN PATENT DOCUMENTS

| | | | |
|---|---|---|---|
| CN | 105468416 | A | 4/2016 |
| CN | 105912370 | A | 8/2016 |
| CN | 106155695 | A | 11/2016 |
| CN | 106202166 | A | 12/2016 |
| CN | 106855826 | A | 6/2017 |
| CN | 107133094 | A | 9/2017 |
| CN | 107145215 | A | 9/2017 |
| CN | 107729081 | A | 2/2018 |
| CN | 107832848 | A | 3/2018 |
| CN | 107870791 | A | 4/2018 |
| JP | 2017091278 | A | 5/2017 |
| WO | 2017131469 | A1 | 8/2017 |

OTHER PUBLICATIONS

European Search Report , Application No. 18861678.3, dated Jul. 13, 2020 (11 pages).

Self-Organizing Map(SOM)Machine Learning Summer 2015; 13 pages.

Self-Organizing Maps(SOMs)@BULLET Resources; WEBSOM-Self-Organizing Maps for Internet Exploration; Resources; Mehotra, K., Mohan, C. K., & Rank.a, S. (1997). Elements of Artificial Neural Networks. MIT Press; • pp. 187-202;—Fausett, L. (1994). Fundamentals of Neural Networks; Prentice Hall. pp. 169-187.

2012 32nd International Conference on Distributed Computing Systems Workshops; 2012 32nd International Conference on Distributed Computing Systems Workshops; Young-Seo! Lee and Sung-Bae Cho; Department of Computer Science Yonsei University; 6 pages.

Proceedings of the Eighth International Conference on Machine Learning and Cybernetics, Baoding, Jul. 12-15, 2009; Use of Neural Networks as Decision Makers in Strategic Situations; Benoit Couraud, Peilin Liu; Department of Electronic Engineering, Shanghai Jiao Tong University, Shanghai, China; 6 pages.

International search report,PCT/CN2018/100684, dated Oct. 31, 2018 (3 pages).

First Office Action from China patent office in a counterpart Chinese patent Application 201710940338.9, dated May 28, 2019 (7 pages).

Indian Examination Report for IN Application 202017018127 dated Jun. 25, 2021. (7 pages).

* cited by examiner self-organizing neural network

APPLICATION MANAGEMENT METHOD, STORAGE MEDIUM, AND ELECTRONIC APPARATUS

CROSS-REFERENCE TO RELATED APPLICATION(S)

The present application is a continuation application of International Patent Application No. PCT/CN2018/100684, filed on Aug. 15, 2018, which claims priority to Chinese Patent Application No. 201710940338.9, filed on Sep. 30, 2017, the entire contents of both of which are hereby incorporated by reference in their entireties.

TECHNICAL FIELD

The present disclosure relates to the technical field of electronic apparatuses, particularly to an application management method, a storage medium, and an electronic apparatus.

BACKGROUND

With the development of electronic technology, an electronic apparatus including smart phones has an increasing number of functions. Users typically have the electronic apparatus installed with a plurality of applications. When a plurality of applications are opened in the electronic apparatus, the plurality of applications opened in the electronic apparatus will still run in the background of the electronic apparatus if the electronic apparatus returns to the home screen or stays in an application interface of an application.

SUMMARY

Embodiments of the present disclosure provide an application management method, a storage medium, and an electronic apparatus, which can reduce memory occupation of the electronic apparatus, and improve operation smoothness of the electronic apparatus.

An embodiment of the present disclosure provides an application management method, which includes: collecting a plurality of characteristic information of an application according to an operation record of the application; learning the plurality of characteristic information through a self-organizing neural network to obtain a self-organizing neural network model of the application, the self-organizing neural network model including a characteristic coefficient matrix of the application; calculating a first characteristic coefficient of the application according to current characteristic information of the application, when the application runs in a background; determining a second characteristic coefficient from the characteristic coefficient matrix according to the first characteristic coefficient; and judging whether the application can be cleaned up according to the second characteristic coefficient.

An embodiment of the present disclosure further provides a non-transitory storage medium storing a computer program, which, when running on a computer, causes the computer to execute the following operations: collecting a plurality of characteristic information of an application according to an operation record of the application; learning the plurality of characteristic information through a self-organizing neural network to obtain a self-organizing neural network model of the application, the self-organizing neural network model including a characteristic coefficient matrix of the application; calculating a first characteristic coefficient of the application according to current characteristic information of the application, when the application runs in a background; determining a second characteristic coefficient from the characteristic coefficient matrix according to the first characteristic coefficient; and judging whether the application can be cleaned up according to the second characteristic coefficient.

An embodiment of the present disclosure further provides an electronic apparatus, which includes a processor and a memory, wherein the memory stores a computer program, and the processor executes the following operations by calling the computer program stored in the memory: collecting a plurality of characteristic information of an application according to an operation record of the application; learning the plurality of characteristic information through a self-organizing neural network to obtain a self-organizing neural network model of the application, the self-organizing neural network model including a characteristic coefficient matrix of the application; calculating a first characteristic coefficient of the application according to current characteristic information of the application, when the application runs in a background; determining a second characteristic coefficient from the characteristic coefficient matrix according to the first characteristic coefficient; and judging whether the application can be cleaned up according to the second characteristic coefficient.

BRIEF DESCRIPTION OF DRAWINGS

In order to more clearly illustrate technical solutions in embodiments of the present disclosure, drawings used in the description of the embodiments will be briefly described below. It is obvious that, the drawings in the following description are only some embodiments of the present disclosure, and for a person skilled in the art, other drawings can also be derived from them without inventive effort.

DETAILED DESCRIPTION

Technical solutions in embodiments of the present application will be clearly and completely described below with reference to the drawings in the embodiments of the present disclosure. It should be apparent that, the described embodiments are only a few embodiments of the present disclosure, and not all embodiments. All other embodiments, which can be derived by a person skilled in the art from the embodiments given herein without inventive step, are intended to be within the scope of the present disclosure.

Figure 1:
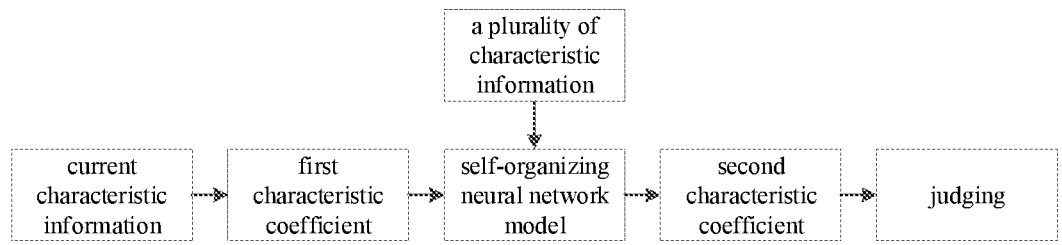
FIG. 1 is a schematic systemic diagram of an application management device according to an embodiment of the present disclosure.

Reference is made to FIG. 1, which is a schematic systemic diagram of an application management device according to an embodiment of the present disclosure. The application management device is mainly used to: collect a plurality of characteristic information of an application according to an operation record of the application; learn the plurality of characteristic information through a self-organizing neural network to obtain a self-organizing neural network model of the application, the self-organizing neural network model including a characteristic coefficient matrix of the application; calculate a first characteristic coefficient of the application according to current characteristic information of the application, when the application runs in a background; determine a second characteristic coefficient from the characteristic coefficient matrix according to the first characteristic coefficient; and judge whether the application can be cleaned up according to the second characteristic coefficient.

Figure 2:
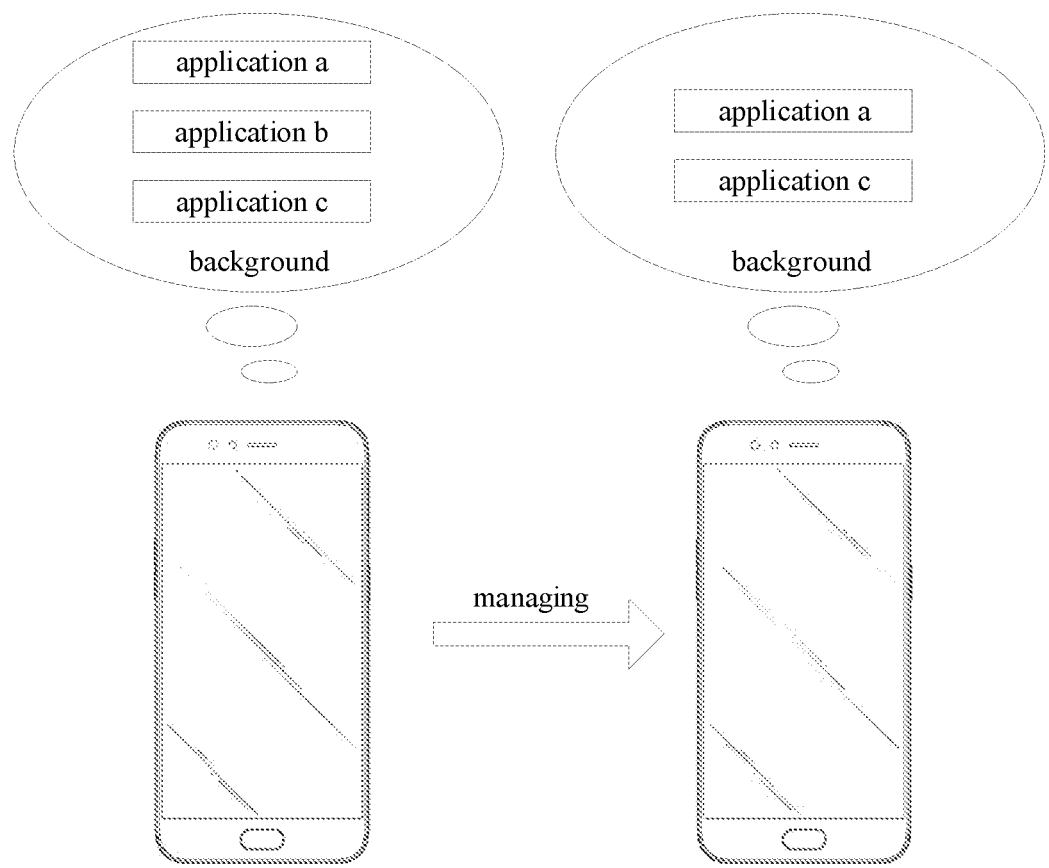
FIG. 2 is a schematic diagram of an application scenario of an application management method according to an embodiment of the present disclosure.

Reference is made to FIG. 2, which is a schematic diagram of an application scenario of an application management method according to an embodiment of the present disclosure. In the embodiment, an electronic apparatus manages a plurality of applications running in the background. For example, an application a, an application b, and an application c are running in the background. The electronic apparatus respectively judges whether the application a, the application b, and the application c can be cleaned up. For example, if it is judged that the application a and the application c cannot be cleaned up and the application b can be cleaned up, the electronic apparatus may clean up the application b while keeping the application a and the application c running in the background. Accordingly, the electronic apparatus may close the application b to release memory occupied by the application b.

An embodiment of the present disclosure provides an application management method, which includes: collecting a plurality of characteristic information of an application according to an operation record of the application; learning the plurality of characteristic information through a self-organizing neural network to obtain a self-organizing neural network model of the application, the self-organizing neural network model including a characteristic coefficient matrix of the application; calculating a first characteristic coefficient of the application according to current characteristic information of the application, when the application runs in a background; determining a second characteristic coefficient from the characteristic coefficient matrix according to the first characteristic coefficient; and judging whether the application can be cleaned up according to the second characteristic coefficient.

In some embodiments, the characteristic coefficient matrix includes a plurality of characteristic coefficients, and the operation of determining a second characteristic coefficient from the characteristic coefficient matrix according to the first characteristic coefficient includes: calculating absolute values of differences between the first characteristic coefficient and the plurality of characteristic coefficients, respectively; and determining, as the second characteristic coefficient, a characteristic coefficient corresponding to a difference with a minimum absolute value.

In some embodiments, the operation of judging whether the application can be cleaned up according to the second characteristic coefficient includes: acquiring a preset duration parameter; comparing the second characteristic coefficient with the preset duration parameter to obtain a comparison result; and judging whether the application can be cleaned up according to the comparison result.

In some embodiments, the operation of acquiring a preset duration parameter includes: determining time corresponding to the second characteristic coefficient according to the second characteristic coefficient; and acquiring the preset duration parameter according to a time period in which the time lies and a preset correspondence relationship, the preset correspondence relationship being a correspondence relationship between the time period and the preset duration parameter.

In some embodiments, the operation of judging whether the application can be cleaned up according to the comparison result includes: judging a result that the application cannot be cleaned up, when the second characteristic coefficient is smaller than or equal to the preset duration parameter; and judging a result that the application can be cleaned up, when the second characteristic coefficient is greater than the preset duration parameter.

In some embodiments, the operation of learning the plurality of characteristic information through a self-organizing neural network to obtain a self-organizing neural network model of the application includes: calculating a plurality of characteristic coefficients of the application according to the plurality of characteristic information collected and connection weights of individual nodes in the self-organizing neural network; and acquiring the self-organizing neural network model of the application according to the plurality of characteristic coefficients obtained.

In some embodiments, during said calculating a plurality of characteristic coefficients of the application according to the plurality of characteristic information collected and connection weights of individual nodes in the self-organizing neural network, calculation is performed according to the following formula.

$$W(t)=W(t-1)+\Theta(t-1)L(t-1)(I(t-1)-W(t-1))$$

In the formula, $W(t)$ is a connection weight of a node at time t, and is also a characteristic coefficient calculated; t represents time at which the calculation is performed; $W(t-1)$ is a connection weight of the node at time $t-1$; $\Theta(t-1)$ is a rate of change of domain radius at the time $t-1$; $L(t-1)$ is a learning rate at the time $t-1$; and $I(t-1)$ is characteristic information input to an input node of the self-organizing neural network at the time $t-1$.

Figure 3:
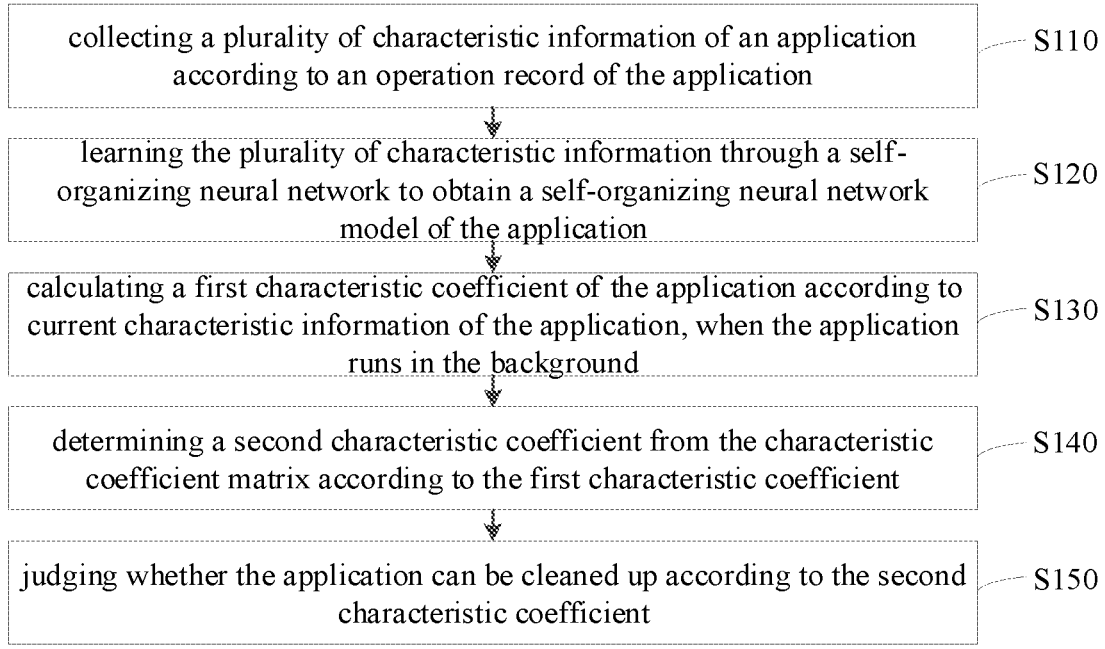
FIG. 3 is a schematic flowchart diagram of an application management method according to an embodiment of the present disclosure.

Reference is made to FIG. 3, which is a schematic flowchart diagram of an application management method according to an embodiment of the present disclosure. The application management method can be applied to an electronic apparatus. The electronic apparatus may be a smart phone, a tablet computer, or the like. The application management method may include the following operations.

S110 is collecting a plurality of characteristic information of an application according to an operation record of the application.

The application may be any application installed in the electronic apparatus, such as a communication application, a multimedia application, a game application, an information application, a shopping application, or the like.

The plurality of characteristic information of the application may include characteristic information inherent to the application itself, for example, an application type of the application. The plurality of characteristic information of the application may also include characteristic information generated during the running process of the application, such as a running duration of the application in the background, the number of times of entering the background a day, a previous running duration in the foreground, a manner of entering the background (such as being switched by the start key (i.e., the HOME key), being switched by a Back key, or being switched by other applications (APPs)) or the like. The plurality of characteristic information of the application may also include characteristic information generated during the running process of the electronic apparatus, such as a screen-off duration, a screen-on duration, and remaining battery capacity, a network status, a charging status or the like of the electronic apparatus.

During the running process of the electronic apparatus, the electronic apparatus may record its own running conditions. For example, the electronic apparatus may record each time when the electronic apparatus turns off the screen, time when the screen is turned on, battery capacity information, the network status, the charging status and the like through a log file. After the above-mentioned application starts to run, the electronic apparatus may further record running conditions of the application. For example, the log file in the electronic apparatus may record time when the application starts to run, time when it runs in a background, a switching manner in which it enters the background, and the like.

When the electronic apparatus receives an application management request, it is possible to obtain a plurality of characteristic information of the application according to the operation record of the application. The application management request may be an operation triggered by a user instruction, or triggered by the electronic apparatus on its own. For example, timing may be set in the electronic apparatus, and whenever time reaches the set timing, the electronic apparatus will trigger the application management operation on its own.

S120 is learning the plurality of characteristic information through a self-organizing neural network to obtain a self-organizing neural network model of the application.

Figure 6:
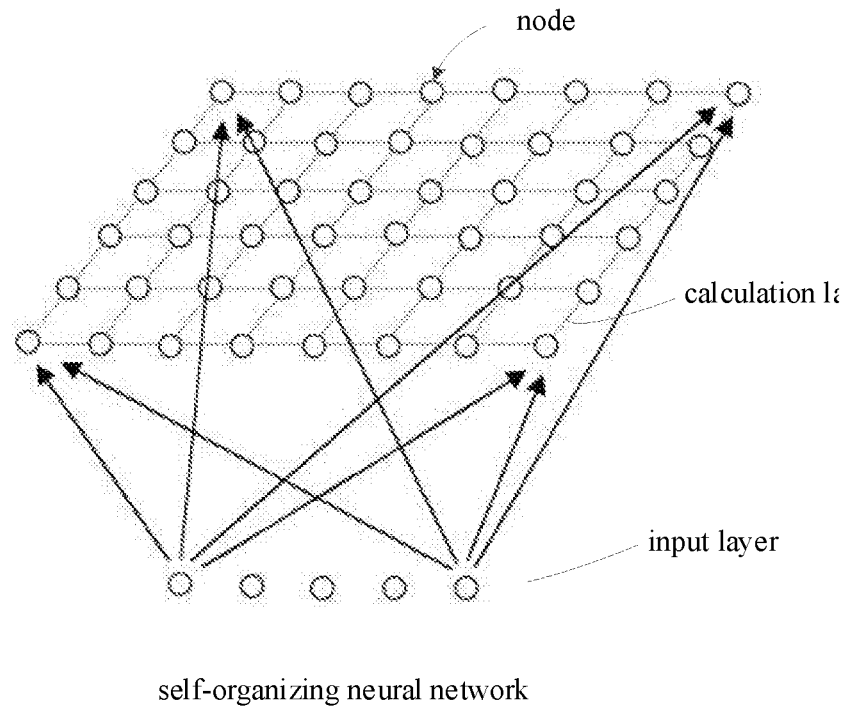
FIG. 6 is a schematic diagram of an architecture of a self-organizing neural network according to an embodiment of the present disclosure.

Reference is made to FIG. 6, which is a schematic diagram of an architecture of a self-organizing neural network according to an embodiment of the present disclosure. The self-organizing neural network is to change the network parameter and structure in a self-organizing and self-adaptive manner by automatically searching for inherent laws and essential attributes in the sample. The self-organizing neural network has an input layer and a calculation layer which each include a plurality of nodes.

After the electronic apparatus collects the plurality of characteristic information of the application, the plurality of characteristic information of the application is input to the input layer of the self-organizing neural network. Subsequently, the self-organizing neural network learns the plurality of characteristic information to obtain a self-organizing neural network model of the application. The self-organizing neural network model includes a characteristic coefficient matrix of the application, which matrix includes a plurality of characteristic coefficients.

Figure 4:
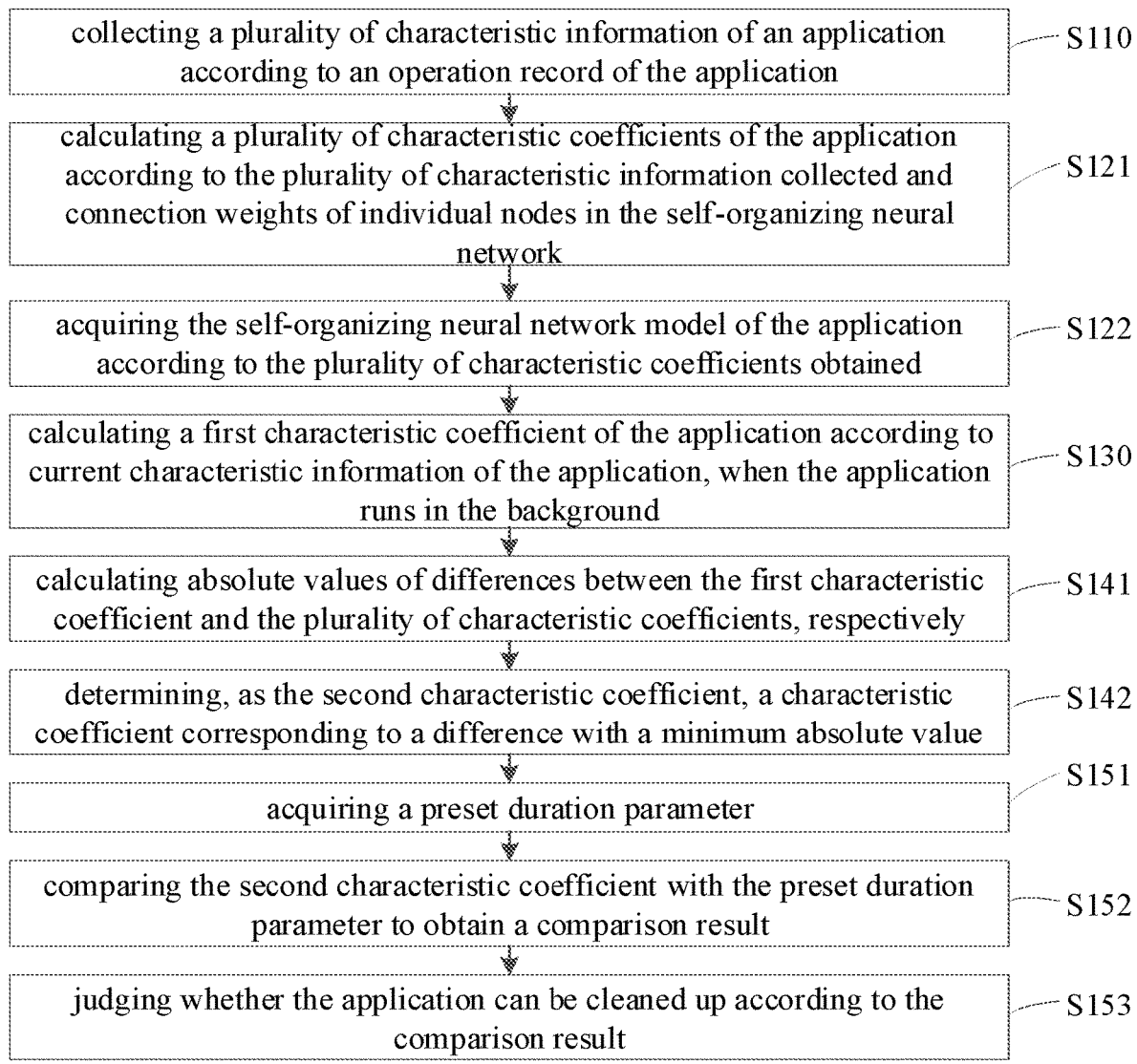
FIG. 4 is another schematic flowchart diagram of an application management method according to an embodiment of the present disclosure.

In some embodiments, as shown in FIG. 4, the S120 of "learning the plurality of characteristic information through a self-organizing neural network to obtain a self-organizing neural network model of the application" includes the following operations. S121 is calculating a plurality of characteristic coefficients of the application according to the plurality of characteristic information collected and connection weights of individual nodes in the self-organizing neural network. S122 is acquiring the self-organizing neural network model of the application according to the plurality of characteristic coefficients obtained.

In some embodiments, after a certain node (an input node) in the input layer of the self-organizing neural network acquires characteristic information, a node (a calculation node) in the calculation layer that best matches the node (the input node) is determined according to the following formula 1.

$$DistFromInput^2 = \sum_{i=0}^{n} (I_i - W_i)^2 \quad \text{formula 1}$$

In the formula 1, DistFromInput represents a distance between the node (the calculation node) in the calculation layer best matching the node (the input node) in the input layer, and the input node; I represents characteristic information input to the node (the input node) in the input layer; W represents connection weights of all nodes within the domain radius; and n represents the plurality of characteristic information input to the node (the input node).

The connection weights W of all the nodes within the domain radius are calculated according to the following formula 2.

$$W(t)=W(t-1)+\Theta(t-1)L(t-1)(I(t-1)-W(t-1)) \quad \text{formula 2:}$$

In the formula 2, t represents time when the calculation is performed; W(t) is a connection weight calculated at the time t and is also a characteristic coefficient calculated; W(t-1) is a connection weight of the node at time (t-1); Θ(t-1) is a rate of change of the domain radius at the time (t-1); L(t-1) is a learning rate at the time (t-1); and I(t-1) is characteristic information input to the input node in the self-organizing neural network at the time (t-1). Θ(t-1) and L(t-1) are calculated according to the following formulae 3 and 4, respectively.

$$\Theta(t-1) = e^{-\frac{DistFromInput^2}{2\sigma^2(t-1)}} \quad \text{formula 3}$$

$$L(t-1) = L_0 e^{-\frac{t-1}{\lambda(t+1)}} \quad \text{formula 4}$$

In the formulae 3 and 4, e is a natural constant (transcendental number), and is a fixed value approximately equal to 2.71828; $L_0$ is a fixed constant, which, for example, may be given a value of 0.3, 0.5, or the like. σ(t-1), which represents domain radius at the time (t-1), is calculated according to the following formula 5.

$$\sigma(t-1) = \sigma_0 e^{-\frac{t-1}{\lambda(t-1)}} \quad \text{formula 5}$$

In the formula 5, $\sigma_0$ is an initial domain radius and is a fixed constant, which, for example, may be given a value 5, 10, or the like. $\lambda(t-1)$, which is an iteration coefficient at the time $(t-1)$, is calculated according to the following formula 6.

$$\lambda(t-1) = \frac{\lambda_0}{\sigma(t-2)} \quad \text{formula 6}$$

In the formula 6, $\lambda_0$ is an initial iteration coefficient and is a fixed constant, which, for example, may be given a value of 1000.

After the electronic apparatus collects the plurality of characteristic information of the application, an iteration operation is performed according to the formulae 1 to 6 to obtain a plurality of connection weights W(t) of the application. The connection weights W(t) are also characteristic coefficients. Finally, the calculated connection weights W(t) constitute a characteristic coefficient matrix. The characteristic coefficient matrix includes a plurality of characteristic coefficients. The characteristic coefficient matrix and a corresponding relationship between the plurality of characteristic coefficients in the characteristic coefficient matrix and time constitute a self-organizing neural network model of the application.

It should be noted that, when constructing the self-organizing neural network model of the application, the electronic apparatus may perform a large number of operations according to the above formulae.

S130 is calculating a first characteristic coefficient of the application according to current characteristic information of the application, when the application runs in the background.

When the application proceeds from the foreground to the background for running, the electronic apparatus may perform a judgment operation on whether the application can be cleaned up.

In some embodiments, when the application runs in the background, the electronic apparatus collects current characteristic information of the application. The current characteristic information may include characteristic information inherent to the application itself, for example, an application type of the application; the current characteristic information may also include characteristic information generated during the running process of the application, such as a running duration of the application in the background, the number of times of entering the background a day, a previous running duration in the foreground, or a manner of entering the background (such as being switched by the start key (i.e., the HOME key), being switched by the Back key, or being switched by other APPs); and the current characteristic information may also include characteristic information generated during the running process of the electronic apparatus, such as a screen-off duration, a screen-on duration, remaining battery capacity, a network status, a charging status or the like of the electronic apparatus.

Subsequently, the electronic apparatus calculates the current characteristic information of the application according to the above formulae 1 to 6 to obtain a first characteristic coefficient of the application.

S140 is determining a second characteristic coefficient from the characteristic coefficient matrix according to the first characteristic coefficient.

After the electronic apparatus calculates the first characteristic coefficient of the application, a second characteristic coefficient of the application may be determined according to the first characteristic coefficient and the self-organizing neural network model of the application.

In some embodiments, the self-organizing neural network model of the application includes a characteristic coefficient matrix of the application. The characteristic coefficient matrix includes a plurality of characteristic coefficients. The electronic apparatus may compare the first characteristic coefficient with a plurality of characteristic coefficients in the characteristic coefficient matrix to determine a second characteristic coefficient from the plurality of characteristic coefficients in the characteristic coefficient matrix.

In the embodiments of the present disclosure, the terms "first" and "second" are only used to distinguish similar objects, and are not necessarily used to describe a particular order or sequence. It should be understood that, the objects described in such manner are interchangeable under appropriate circumstances.

In some embodiments, as shown in FIG. 4, the operation S140 of "determining a second characteristic coefficient from the characteristic coefficient matrix according to the first characteristic coefficient" includes the following operations. S141 is calculating absolute values of differences between the first characteristic coefficient and the plurality of characteristic coefficients, respectively. S142 is determining, as the second characteristic coefficient, a characteristic coefficient corresponding to a difference with a minimum absolute value.

After the electronic apparatus calculates the first characteristic coefficient of the application, the first characteristic coefficient is compared with the plurality of characteristic coefficients in the characteristic coefficient matrix, respectively; differences between the first characteristic coefficient and the plurality of characteristic coefficients are calculated; and absolute values of the differences are calculated.

After absolute values of a plurality of differences are obtained, a minimum absolute value is determined from the absolute values of the plurality of differences. Then, the characteristic coefficient corresponding to the difference with the minimum absolute value is determined as the second characteristic coefficient.

S150 is judging whether the application can be cleaned up according to the second characteristic coefficient.

After the electronic apparatus calculates the second characteristic coefficient of the application, it is possible to make a judgment according to the second characteristic coefficient to determine whether the application can be cleaned up. If the application cannot be cleaned up, the application is kept running in the background, to allow the process of the application to reside in the system. If the application can be cleaned up, the process of the application may be ended to close the application, thereby releasing memory occupied by the application.

In some embodiments, as shown in FIG. 4, the operation S150 of "judging whether the application can be cleaned up according to the second characteristic coefficient" includes the following operations. S151 is acquiring a preset duration parameter. S152 is comparing the second characteristic coefficient with the preset duration parameter to obtain a comparison result. S153 is judging whether the application can be cleaned up according to the comparison result.

The preset duration parameter may be a duration value preset in the electronic apparatus. For example, the preset duration parameter may be 10 minutes. After the electronic apparatus calculates the second characteristic coefficient of the application, the preset duration parameter is retrieved from the electronic apparatus. Subsequently, the second characteristic coefficient is compared with the preset duration parameter to obtain a comparison result. The comparison result is a size relationship between the second characteristic coefficient and the preset duration parameter. The comparison result includes the following: the second characteristic coefficient is smaller than or equal to the preset duration parameter, or the second characteristic coefficient is greater than the preset duration parameter. Then, the electronic apparatus judges whether the application can be cleaned up according to the comparison result.

Figure 5:
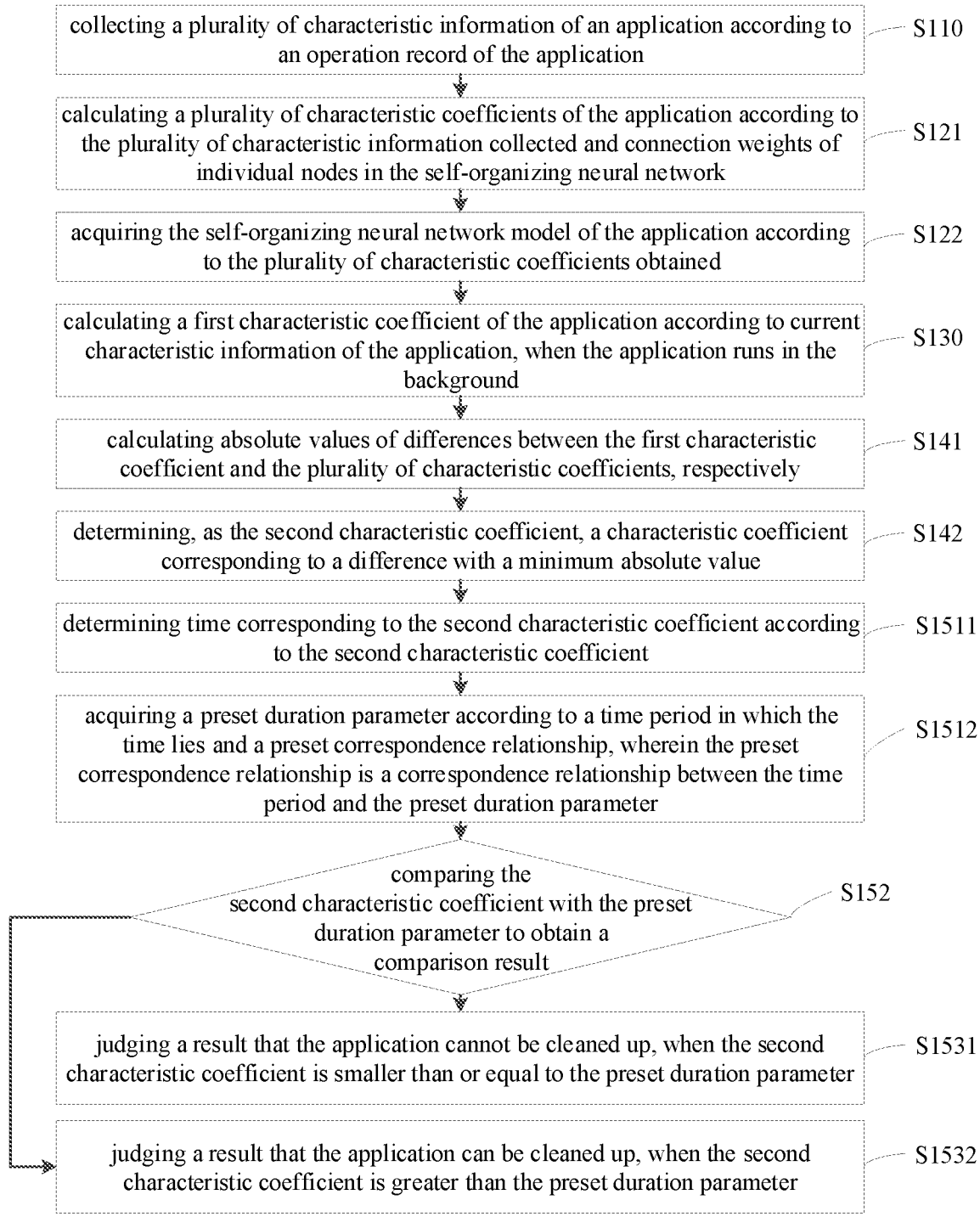
FIG. 5 is still another schematic flowchart diagram of an application management method according to an embodiment of the present disclosure.

In some embodiments, as shown in FIG. 5, the operation S151 of "acquiring a preset duration parameter" includes the following operations. S1511 is determining time corresponding to the second characteristic coefficient according to the second characteristic coefficient. S1512 is acquiring a preset duration parameter according to a time period in which the time lies and a preset correspondence relationship, wherein the preset correspondence relationship is a correspondence relationship between the time period and the preset duration parameter.

The second characteristic coefficient is a characteristic coefficient determined from the self-organizing neural network model of the application. The second characteristic coefficient is a function with regard to time t. The electronic apparatus may determine time corresponding to the second characteristic coefficient according to the second characteristic coefficient.

In the electronic apparatus, a correspondence relationship between time periods and preset duration parameters may be preset. For example, 24 hours of a day may be divided into four time periods: 0:00~6:00, 6:00~12:00, 12:00~18:00, 18:00~24:00. Each time period may be configured with a corresponding preset duration parameter. For example, the preset duration parameter corresponding to 0:00~6:00 is 8 minutes, the preset duration parameter corresponding to 6:00~12:00 is 10 minutes, the preset duration parameter corresponding to 12:00~18:00 is 15 minutes, and the preset duration parameter corresponding to 18:00~24:00 is 20 minutes.

After the electronic apparatus determines time corresponding to the second characteristic coefficient, a time period in which the time lies is further determined. Subsequently, the preset duration parameter is acquired according to the time period and the correspondence relationship between the time period and the preset duration parameter.

In some embodiments, as shown in FIG. 5, the operation S153 of "judging whether the application can be cleaned up according to the comparison result" includes the following operations. S1532 is judging a result that the application cannot be cleaned up, when the second characteristic coefficient is smaller than or equal to the preset duration parameter. S1531 is judging a result that the application can be cleaned up, when the second characteristic coefficient is greater than the preset duration parameter.

After the electronic apparatus obtains the comparison result between the second characteristic coefficient and the preset duration parameter, it is judged whether the application can be cleaned up according to the comparison result.

In some embodiments, when the second characteristic coefficient is smaller than or equal to the preset duration parameter, it is shown that the application may be switched again to the foreground for running within the time period of the preset duration parameter, and in this case, a result is judged that the application cannot be cleaned up. For example, when the second characteristic coefficient is smaller than the preset duration parameter 10 minutes, it is shown that the application may be switched by the user again to the foreground for running in the next 10 minutes, and in this case, the application cannot be cleaned up.

When the second characteristic coefficient is greater than the preset duration parameter, it is shown that the application will not be switched again to the foreground for running within the time period of the preset duration parameter, i.e., the user will not use the application again, and in this case, a result is judged that the application can be cleaned up. For example, when the second characteristic coefficient is greater than the preset duration parameter 15 minutes, it is shown that the application will not be run by the user again in the next 15 minutes, and in this case, the application can be cleaned up. Subsequently, the electronic apparatus may close the application.

In an actual implementation, the present disclosure is not limited by the execution order of the various operations described, and in the case of no conflict, some operations may be further performed in other order or simultaneously.

It can be known from above that, the application management method provided in the embodiment of the present disclosure collects a plurality of characteristic information of the application according to an operation record of the application; learns the plurality of characteristic information through a self-organizing neural network to obtain a self-organizing neural network model of the application; calculates a first characteristic coefficient of the application according to current characteristic information of the application, when the application runs in the background; determines a second characteristic coefficient from a characteristic coefficient matrix according to the first characteristic coefficient; and judges whether the application can be cleaned up according to the second characteristic coefficient. This solution judges whether the application can be cleaned up according to the second characteristic coefficient of the application, thereby making it possible to accurately judge when the application can be cleaned up according to actual running circumstances of the application. When the application can be cleaned up, the application is closed in time to release memory of the electronic apparatus, thereby making it possible to reduce memory occupancy of the electronic apparatus and to improve running consistency of the electronic apparatus.

An embodiment of the present disclosure further provides an application management device which may be integrated in an electronic apparatus. The electronic equipment may be a smart phone, a tablet computer, or the like.

An embodiment of the present disclosure provides an application management device which includes: a collection module, configured to collect a plurality of characteristic information of an application according to an operation record of the application; a learning module, configured to learn the plurality of characteristic information through a self-organizing neural network to obtain a self-organizing neural network model of the application, the self-organizing neural network model including a characteristic coefficient matrix of the application; a calculation module, configured to calculate a first characteristic coefficient of the application according to current characteristic information of the application, when the application runs in a background; a determination module, configured to determine a second characteristic coefficient from the characteristic coefficient matrix according to the first characteristic coefficient; and a judgment module, configured to judge whether the application can be cleaned up according to the second characteristic coefficient.

Figure 7:
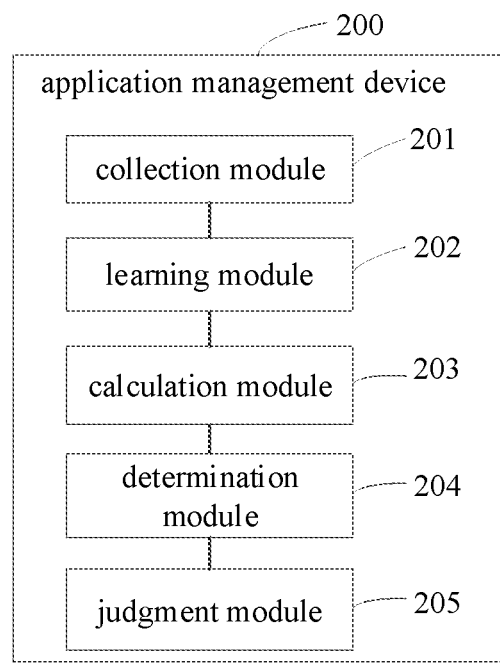
FIG. 7 is a schematic structural diagram of an application management device according to an embodiment of the present disclosure.

As shown in FIG. 7, the application management device 200 may include: a collection module 201, a learning module 202, a calculation module 203, a determination module 204, and a judgment module 205.

The collection module 201 is configured to collect a plurality of characteristic information of an application according to an operation record of the application.

The application may be any application installed in the electronic apparatus, such as a communication application, a multimedia application, a game application, an information application, a shopping application, or the like.

The plurality of characteristic information of the application may include characteristic information inherent to the application itself, for example, an application type of the application; the plurality of characteristic information of the application may also include characteristic information generated during the running process of the application, such as a running duration of the application in the background, the number of times of entering the background a day, a previous running duration in the foreground, a manner of entering the background (such as being switched by the start key (i.e., the HOME key), being switched by the Back key, or being switched by other APPs), or the like; and the plurality of characteristic information of the application may also include characteristic information generated during the running process of the electronic apparatus, such as a screen-off duration, a screen-on duration, and remaining battery capacity, a network status, a charging status or the like of the electronic apparatus.

During the running process of the electronic apparatus, the application management device 200 may record running conditions of the electronic apparatus. For example, it is possible to record each time when the electronic apparatus turns off the screen, time when the screen is turned on, battery capacity information, a network status, and a charging status via a log file. After the above-mentioned application starts to run, the application management device 200 may further record running conditions of the application. For example, the log file in the electronic apparatus may record time when the application starts to run, time when the application runs in the background, a switching manner of entering the background, and the like.

When the application management device 200 receives an application management request, the collection module 201 may acquire the plurality of characteristic information of the application according to the operation record of the application. The application management request may be an operation triggered by a user instruction, or triggered by the electronic apparatus on its own. For example, timing may be set in the electronic apparatus, and whenever time reaches the set timing, the electronic apparatus will trigger the application management operation on its own.

The learning module 202 is configured to learn the plurality of characteristic information through a self-organizing neural network to obtain a self-organizing neural network model of the application.

The self-organizing neural network changes the network parameter and structure in a self-organizing and self-adaptive manner, by automatically searching for inherent laws and essential attributes in the sample. The self-organizing neural network has an input layer and a calculation layer which each include a plurality of nodes.

After the collection module 201 collects the plurality of characteristic information of the application, the learning module 202 inputs the plurality of characteristic information of the application to the input layer of the self-organizing neural network. Subsequently, the self-organizing neural network learns the plurality of characteristic information to obtain a self-organizing neural network model of the application. The self-organizing neural network model includes a characteristic coefficient matrix of the application, which matrix includes a plurality of characteristic coefficients.

In some embodiments, the learning module 202 is configured to execute the following operations: calculating a plurality of characteristic coefficients of the application according to the plurality of characteristic information collected and connection weights of individual nodes in the self-organizing neural network; acquiring the self-organizing neural network model of the application according to the plurality of characteristic coefficients obtained.

In some embodiments, after a certain node (an input node) in the input layer of the self-organizing neural network acquires the characteristic information, the learning module 202 determines a node (a calculation node) in the calculation layer best matching the node (the input node) according to the following formula 7.

$$DistFromInput^2 = \sum_{i=0}^{n}(I_i - W_i)^2 \quad \text{formula 7}$$

In the formula 7, DistFromInput represents a distance between the node (the calculation node) in the calculation layer best matching the node (the input node) in the input layer, and the input node; I represents characteristic information input to the node (the input node) in the input layer; W represents connection weights of all nodes within the domain radius; and n represents the plurality of characteristic information input to the node (the input node).

The connection weights W of all the nodes in the domain radius are calculated according to the following formula 8.

$$W(t)=W(t-1)+\Theta(t-1)L(t-1)(I(t-1)-W(t-1)) \quad \text{formula 8:}$$

In the formula 8, t represents time when the calculation is performed; W(t) is a connection weight calculated at the time t and is also a characteristic coefficient calculated; W(t−1) is a connection weight of the node at time (t−1); Θ(t−1) is a rate of change of the domain radius at the time (t−1); L(t−1) is a learning rate at the time (t−1); and I(t−1) is characteristic information input into the input node in the self-organizing neural network at the time (t−1). Θ (t−1) and L (t−1) are calculated according to the following formulae 9 and 10, respectively.

$$\Theta(t-1) = e^{-\frac{DistFromInput^2}{2\sigma^2(t-1)}} \quad \text{formula 9}$$

$$L(t-1) = L_0 e^{-\frac{t-1}{\lambda(t-1)}} \quad \text{formula 10}$$

In the formulae 9 and 10, e is a natural constant (transcendental number), and is a fixed value approximately equal to 2.71828; and $L_0$ is a fixed constant, which, for example, may be given a value of 0.3, 0.5, or the like. σ(t−1), which represents domain radius at the time (t−1), is calculated according to the following formula 11.

$$\sigma(t-1) = \sigma_0 e^{-\frac{t-1}{\lambda(t-1)}} \quad \text{formula 11}$$

In the formula 11, $\sigma_0$ is an initial domain radius and is a fixed constant, which, for example, may be given a value 5, 10, or the like. λ(t−1), which is an iteration coefficient at the time (t−1), is calculated according to the following formula 12.

$$\lambda(t-1) = \frac{\lambda_0}{\sigma(t-2)} \qquad \text{formula 12}$$

In the formula 12, $\lambda_0$ is an initial iteration coefficient and is a fixed constant, which, for example, may be given a value of 1000.

After the collection module 201 collects the plurality of characteristic information of the application, the learning module 202 performs an iteration operation according to the formulae 7 to 12 to obtain a plurality of connection weights W(t) of the application. The connection weights W(t) are also characteristic coefficients. Finally, the calculated connection weights W(t) constitute a characteristic coefficient matrix. The characteristic coefficient matrix includes a plurality of characteristic coefficients. The characteristic coefficient matrix and a corresponding relationship between the plurality of characteristic coefficients in the characteristic coefficient matrix and time constitute a self-organizing neural network model of the application.

It should be noted that, when constructing the self-organizing neural network model of the application, the learning module 202 may perform a large number of operations according to the above formulae.

The calculation module 203 is configured to calculate a first characteristic coefficient of the application according to current characteristic information of the application, when the application runs in the background.

When the application proceeds from the foreground to the background for running, the application management device 200 may perform a judgment operation on whether the application can be cleaned up.

In some embodiments, when the application runs in the background, the calculation module 203 collects current characteristic information of the application. The current characteristic information may include characteristic information inherent to the application itself, for example, an application type of the application; the current characteristic information may also include characteristic information generated during the running process of the application, such as a running duration of the application in the background, the number of times of entering the background a day, a previous running duration in the foreground, a manner of entering the background (such as being switched by the start key (i.e., the HOME key), being switched by the Back key, or being switched by other APPs), or the like; and the current characteristic information may also include characteristic information generated during the running process of the electronic apparatus, such as a screen-off duration, a screen-on duration, remaining battery capacity, a network status, a charging status, or the like of the electronic apparatus.

Subsequently, the calculation module 203 calculates the current characteristic information of the application according to the above formulae 7 to 12 to obtain a first characteristic coefficient of the application.

The determination module 204 is configured to determine a second characteristic coefficient from the characteristic coefficient matrix according to the first characteristic coefficient.

After the calculation module 203 calculates the first characteristic coefficient of the application, the determination module 204 may determine the second characteristic coefficient of the application according to the first characteristic coefficient and a self-organizing neural network model of the application.

In some embodiments, the self-organizing neural network model of the application includes a characteristic coefficient matrix of the application, which matrix includes a plurality of characteristic coefficients. The determination module 204 may compare the first characteristic coefficient with a plurality of characteristic coefficients in the characteristic coefficient matrix, respectively, to determine the second characteristic coefficient from the plurality of characteristic coefficients in the characteristic coefficient matrix.

Figure 8:
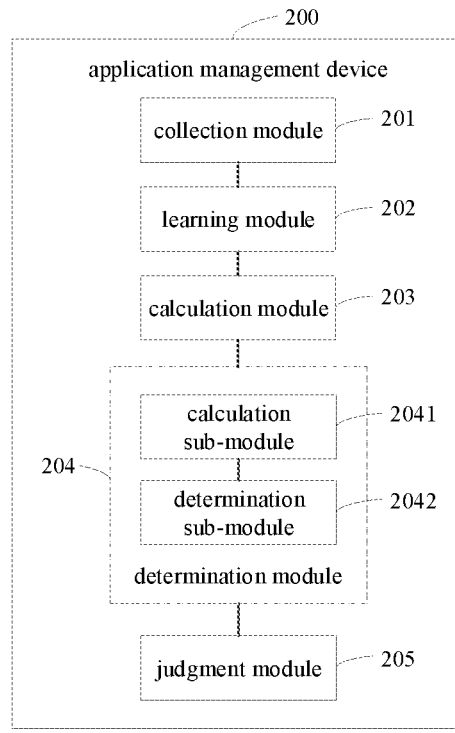
FIG. 8 is another schematic structural diagram of an application management device according to an embodiment of the present disclosure.

In some embodiments, as shown in FIG. 8, the determination module 204 includes a calculation sub-module 2041 and a determination sub-module 2042.

The calculation sub-module 2041 is configured to calculate absolute values of differences between the first characteristic coefficient and the plurality of characteristic coefficients, respectively.

The determination sub-module 2042 is configured to determine, as a second characteristic coefficient, a characteristic coefficient corresponding to a difference with a minimum absolute value.

After the calculation module 203 calculates the first characteristic coefficient of the application, the calculation sub-module 2041 compares the first characteristic coefficient with a plurality of characteristic coefficients in the characteristic coefficient matrix, respectively, calculates differences between the first characteristic coefficient and the plurality of characteristic coefficients, and calculates absolute values of the differences.

After obtaining absolute values of a plurality of differences, the determination sub-module 2042 determines a minimum one from the absolute values of the plurality of differences. Subsequently, the characteristic coefficient corresponding to a difference with a minimum absolute value is determined as the second characteristic coefficient.

The judgment module 205 is configured to judge whether the application can be cleaned up according to the second characteristic coefficient.

After the determination module 204 obtains the second characteristic coefficient of the application, the judgment module 205 may perform judgment according to the second characteristic coefficient to determine whether the application can be cleaned up. If the application cannot be cleaned up, the application is kept running in the background to allow the process of the application to reside in the system. If the application can be cleaned up, the process of the application may be ended to close the application, thereby releasing memory occupied by the application.

Figure 9:
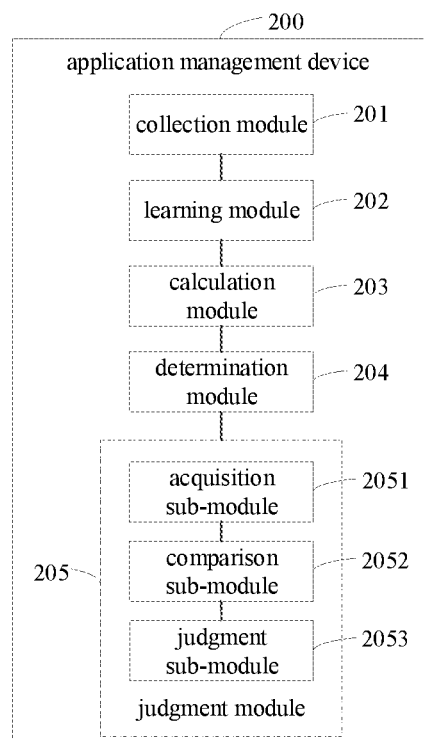
FIG. 9 is still another schematic structural diagram of an application management device according to an embodiment of the present disclosure.

In some embodiments, as shown in FIG. 9, the judgment module 205 includes: an acquisition sub-module 2051, a comparison sub-module 2052, and a judgment sub-module 2053.

The acquisition sub-module 2051 is configured to acquire a preset duration parameter.

The comparison sub-module 2052 is configured to compare the second characteristic coefficient with the preset duration parameter to obtain a comparison result.

The judgment sub-module 2053 is configured to judge whether the application can be cleaned up according to the comparison result.

The preset duration parameter may be a duration value preset in the electronic apparatus. For example, the preset duration parameter may be 10 minutes. After the determination module 204 obtains the second characteristic coefficient of the application, the acquisition sub-module 2051 retrieves the preset duration parameter from the electronic apparatus. Subsequently, the comparison sub-module 2052 compares the second characteristic coefficient with the preset duration parameter to obtain a comparison result. The comparison result is a size relationship between the second characteristic coefficient and the preset duration parameter. The comparison result includes the following: the second characteristic coefficient is smaller than or equal to the preset duration parameter, or the second characteristic coefficient is greater than the preset duration parameter. Then, the judgment sub-module 2053 judges whether the application can be cleaned up according to the comparison result.

In some embodiments, the acquisition sub-module 2051 is configured to execute the following operations: determining time corresponding to the second characteristic coefficient according to the second characteristic coefficient; and acquiring a preset duration parameter according to a time period in which the time lies and a preset correspondence relationship, wherein the preset correspondence relationship is a correspondence relationship between the time period and the preset duration parameter.

The second characteristic coefficient is a characteristic coefficient determined from the self-organizing neural network model of the application. The second characteristic coefficient is a function with regard to time t. The acquisition sub-module 2051 may determine time corresponding to the second characteristic coefficient according to the second characteristic coefficient.

In the electronic apparatus, a correspondence relationship between time periods and preset duration parameters may be preset. For example, 24 hours of a day may be divided into four time periods: 0:00~6:00, 6:00~12:00, 12:00~18:00, 18:00~24:00. Each time period may be provided with a corresponding preset duration parameter. For example, the preset duration parameter corresponding to 0:00~6:00 is 8 minutes, the preset duration parameter corresponding to 6:00~12:00 is 10 minutes, the preset duration parameter corresponding to 12:00~18:00 is 15 minutes, and the preset duration parameter corresponding to 18:00~24:00 is 20 minutes.

After the acquisition sub-module 2051 determines time corresponding to the second characteristic coefficient, a time period in which the time lies is further determined. Subsequently, the preset duration parameter is acquired according to the time period and the correspondence relationship between the time period and the preset duration parameter.

In some embodiments, the judgment sub-module 2053 is configured to execute the following operations: judging a result that the application cannot be cleaned up, when the second characteristic coefficient is smaller than or equal to the preset duration parameter; judging a result that the application can be cleaned up, when the second characteristic coefficient is greater than the preset duration parameter.

After the comparison sub-module 2052 obtains the comparison result between the second characteristic coefficient and the preset duration parameter, the judgment sub-module 2053 judges whether the application can be cleaned up according to the comparison result.

In some embodiments, when the second characteristic coefficient is smaller than or equal to the preset duration parameter, it is shown that the application may be switched again to the foreground for running within the time period of the preset duration parameter, and in this case, a result is judged that the application cannot be cleaned up. For example, when the second characteristic coefficient is smaller than the preset duration parameter 10 minutes, it is shown that the application may be switched by the user again to the foreground for running in the next 10 minutes, and in this case, the application cannot be cleaned up.

When the second characteristic coefficient is greater than the preset duration parameter, it is shown that the application will not be switched again to the foreground for running within the time period of the preset duration parameter, i.e., the user will not use the application again, and in this case, a result is judged that the application can be cleaned up. For example, when the second characteristic coefficient is greater than the preset duration parameter 15 minutes, it is shown that the application will not be run by the user again in the next 15 minutes, and in this case, the application can be cleaned up. Subsequently, the application management device 200 may close the application.

In an actual implementation, the various modules described above may be implemented as independent entities; and may also be combined in an arbitrary manner to be implemented as a same entity or several entities.

It can be known from above that, in the application management device 200 provided in the embodiment of the present disclosure, the collection module 201 collects a plurality of characteristic information of the application according to an operation record of the application; the learning module 202 learns the plurality of characteristic information through a self-organizing neural network to obtain a self-organizing neural network model of the application; the calculation module 203 calculates a first characteristic coefficient of the application according to current characteristic information of the application, when the application runs in the background; the determination module 204 determines a second characteristic coefficient from a characteristic coefficient matrix according to the first characteristic coefficient; and the judgment module 205 judges whether the application can be cleaned up according to the second characteristic coefficient. This solution judges whether the application can be cleaned up according to the second characteristic coefficient of the application, thereby making it possible to accurately judge when the application can be cleaned up according to actual running circumstances of the application. When the application can be cleaned up, the application is closed in time to release memory of the electronic apparatus, thereby making it possible to reduce memory occupancy of the electronic apparatus and to improve running consistency of the electronic apparatus.

Figure 10:
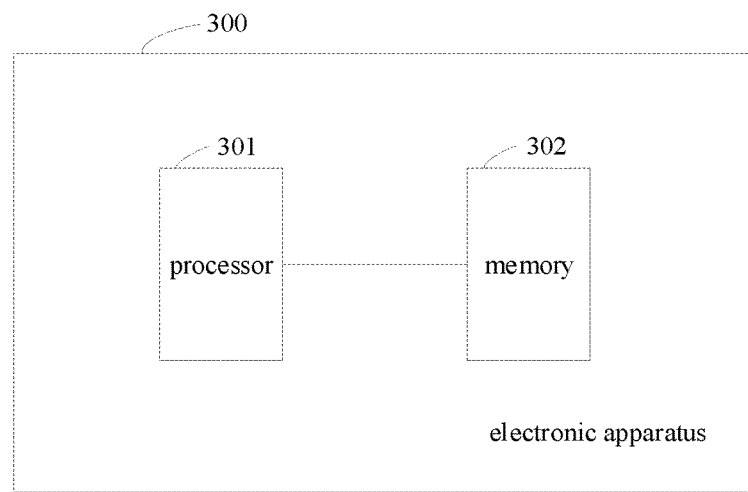
FIG. 10 is a schematic structural diagram of an electronic apparatus according to an embodiment of the present disclosure.

An embodiment of the present application further provides an electronic apparatus. The electronic apparatus may be a smart phone, a tablet computer, or the like. As shown in FIG. 10, the electronic apparatus 300 includes a processor 301 and a memory 302 which are electrically connected to each other.

The processor 301 is a control center of the electronic apparatus 300. Various interfaces and lines are used to connect various parts of the entire electronic apparatus; and various functions and data processing of the electronic apparatus are performed by running or calling a computer program stored in the memory 302, and calling data stored in the memory 302, so as to monitor the electronic apparatus as a whole.

In the present embodiment, the processor 301 in the electronic apparatus 300 loads instructions corresponding to the process of one or more computer programs into the memory 302 according to the following operations, and the processor 301 is configured to run the computer program stored in the memory 302 to implement the following various functions: collecting a plurality of characteristic information of an application according to an operation record of the application; learning the plurality of characteristic information through a self-organizing neural network to obtain a self-organizing neural network model of the application, the self-organizing neural network model including a characteristic coefficient matrix of the application; calculating a first characteristic coefficient of the application according to current characteristic information of the application, when the application runs in a background; determining a second characteristic coefficient from the characteristic coefficient matrix according to the first characteristic coefficient; and judging whether the application can be cleaned up according to the second characteristic coefficient.

In some embodiments, the characteristic coefficient matrix includes a plurality of characteristic coefficients. When a second characteristic coefficient is determined from the characteristic coefficient matrix according to the first characteristic coefficient, the processor 301 executes the following operations: calculating absolute values of differences between the first characteristic coefficient and the plurality of characteristic coefficients, respectively; and determining, as a second characteristic coefficient, a characteristic coefficient corresponding to a difference with a minimum absolute value.

In some embodiments, when judging whether the application can be cleaned up according to the second characteristic coefficient, the processor 301 executes the following operations: acquiring a preset duration parameter; comparing the second characteristic coefficient with the preset duration parameter to obtain a comparison result; and judging whether the application can be cleaned up according to the comparison result.

In some embodiments, when acquiring the preset duration parameter, the processor 301 executes the following operations: determining time corresponding to the second characteristic coefficient according to the second characteristic coefficient; and acquiring a preset duration parameter according to a time period in which the time lies and a preset correspondence relationship, wherein the preset correspondence relationship is a correspondence relationship between the time period and the preset duration parameter.

In some embodiments, when judging whether the application can be cleaned up according to the comparison result, the processor 301 executes the following operations: judging a result that the application cannot be cleaned up, when the second characteristic coefficient is smaller than or equal to the preset duration parameter; and judging a result that the application can be cleaned up, when the second characteristic coefficient is greater than the preset duration parameter.

In some embodiments, when learning the plurality of characteristic information through a self-organizing neural network to obtain a self-organizing neural network model of the application, the processor 301 executes the following operations: calculating a plurality of characteristic coefficients of the application according to the plurality of characteristic information collected and connection weights of individual nodes in the self-organizing neural network; and acquiring the self-organizing neural network model of the application according to the plurality of characteristic coefficients obtained.

In some embodiments, when calculating a plurality of characteristic coefficients of the application according to the plurality of characteristic information collected and the connection weights of the individual nodes in the self-organizing neural network, the processor 301 performs the calculation according to the following formula.

$$W(t)=W(t-1)+\Theta(t-1)L(t-1)(I(t-1)-W(t-1))$$

In the formula, $W(t)$ is a connection weight of a node at time t and is also a characteristic coefficient calculated at the time t; t represents time at which the calculation is performed; $W(t-1)$ is a connection weight of the node at time $t-1$; $\Theta(t-1)$ is a rate of change of domain radius at the time $t-1$; $L(t-1)$ is a learning rate at the time $t-1$; and $I(t-1)$ is characteristic information input to an input node in the self-organizing neural network at the time $t-1$.

The memory 302 may be configured to store computer programs and data. The computer programs stored in the memory 302 contain instructions executable in the processor. The computer programs may constitute various functional modules. The processor 301 calls the computer programs stored in the memory 302 to execute various functional applications and data processing.

Figure 11:
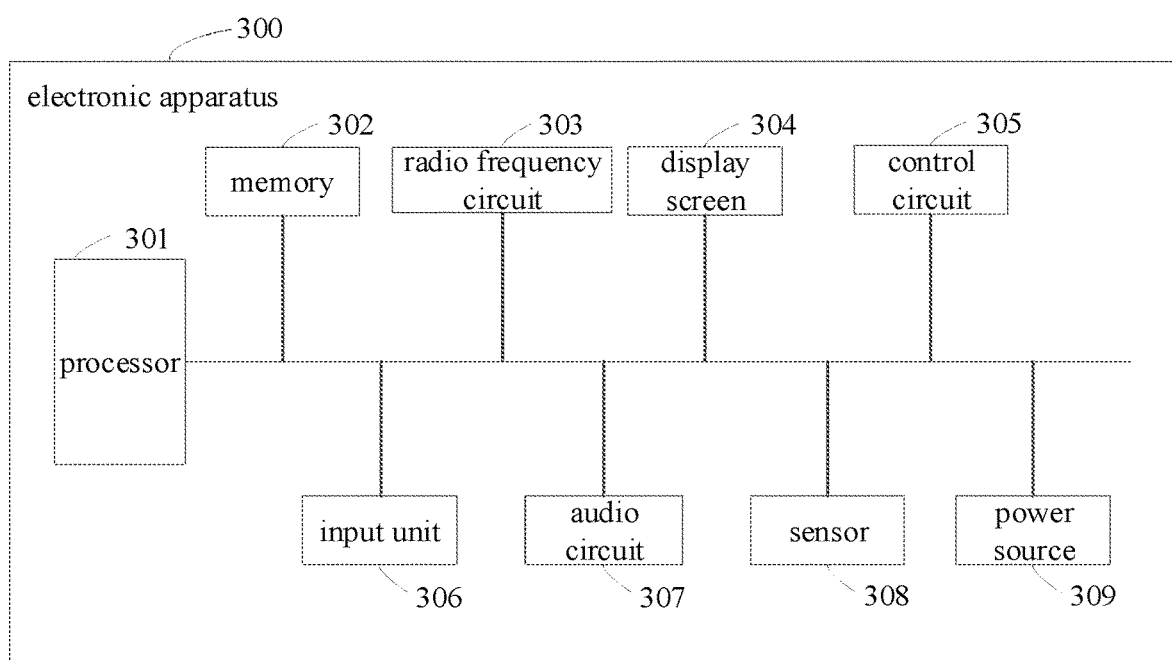
FIG. 11 is another schematic structural diagram of an electronic apparatus according to an embodiment of the present disclosure.

In some embodiments, as shown in FIG. 11, the electronic apparatus 300 further includes a radio frequency circuit 303, a display screen 304, a control circuit 305, an input unit 306, an audio circuit 307, a sensor 308, and a power source 309. The processor 301 is electrically connected to the radio frequency circuit 303, the display screen 304, the control circuit 305, the input unit 306, the audio circuit 307, the sensor 308, and the power source 309, respectively.

The radio frequency circuit 303 is configured to receive and transmit radio frequency signals to communicate with network equipment or other electronic apparatus through wireless communication.

The display screen 304 may be configured to display information input by the user or information provided to the user and various graphical user interfaces of the electronic apparatus. These graphical user interfaces may be composed of images, texts, icons, videos, and any combination thereof.

The control circuit 305, which is electrically connected to the display screen 304, is configured to control the display screen 304 to display information.

The input unit 306 may be configured to receive input numbers, character information, or user characteristic information (i.e., fingerprints), and to generate keyboard, mouse, joystick, optical or trackball signal inputs related to user settings and function control. The input unit 306 may include a fingerprint recognition module.

The audio circuit 307 may provide an audio interface between the user and the electronic apparatus through a speaker or a microphone.

The sensor 308 is configured to collect external environment information. The sensor 308 may include one or more of sensors such as an ambient brightness sensor, an acceleration sensor, and a gyroscope.

The power source 309 is configured to supply power to various components of the electronic apparatus 300. In some embodiments, the power source 309 may be logically connected to the processor 301 through a power management system, so as to implement functions such as management of charging and discharging and power consumption management through the power management system.

Although not shown in FIG. 11, the electronic apparatus 300 may further include a camera, a Bluetooth module, and the like, and details are not described herein again.

It can be known from above that, an embodiment of the present disclosure provides an electronic apparatus, which is configured to: collect a plurality of characteristic information of the application according to an operation record of the application; learn the plurality of characteristic information through a self-organizing neural network to obtain a self-organizing neural network model of the application;

calculate a first characteristic coefficient of the application according to current characteristic information of the application, when the application runs in the background; and determine a second characteristic coefficient from a characteristic coefficient matrix according to the first characteristic coefficient; and judge whether the application can be cleaned up according to the second characteristic coefficient. This solution judges whether the application can be cleaned up according to the second characteristic coefficient of the application, thereby making it possible to accurately judge when the application can be cleaned up according to actual running circumstances of the application. When the application can be cleaned up, the application is closed in time to release memory of the electronic apparatus, thereby making it possible to reduce memory occupancy of the electronic apparatus and to improve running consistency of the electronic apparatus.

An embodiment of the present disclosure further provides a storage medium having stored therein a computer program. When the computer program runs on a computer, the computer executes the application management method according to any one of the foregoing embodiments.

An embodiment of the present disclosure provides a storage medium storing a computer program, which, when running on a computer, causes the computer to execute the following operations: collecting a plurality of characteristic information of an application according to an operation record of the application; learning the plurality of characteristic information through a self-organizing neural network to obtain a self-organizing neural network model of the application, the self-organizing neural network model including a characteristic coefficient matrix of the application; calculating a first characteristic coefficient of the application according to current characteristic information of the application, when the application runs in a background; determining a second characteristic coefficient from the characteristic coefficient matrix according to the first characteristic coefficient; and judging whether the application can be cleaned up according to the second characteristic coefficient.

In some embodiments, the characteristic coefficient matrix includes a plurality of characteristic coefficients, and the operation of determining a second characteristic coefficient from the characteristic coefficient matrix according to the first characteristic coefficient includes: calculating absolute values of differences between the first characteristic coefficient and the plurality of characteristic coefficients, respectively; and determining, as the second characteristic coefficient, a characteristic coefficient corresponding to a difference with a minimum absolute value.

In some embodiments, the operation of judging whether the application can be cleaned up according to the second characteristic coefficient includes: acquiring a preset duration parameter; comparing the second characteristic coefficient with the preset duration parameter to obtain a comparison result; and judging whether the application can be cleaned up according to the comparison result.

In some embodiments, the operation of acquiring a preset duration parameter includes: determining time corresponding to the second characteristic coefficient according to the second characteristic coefficient; acquiring the preset duration parameter according to a time period in which the time lies and a preset correspondence relationship, the preset correspondence relationship being a correspondence relationship between the time period and the preset duration parameter.

In some embodiments, the operation of judging whether the application can be cleaned up according to the comparison result includes: judging a result that the application cannot be cleaned up, when the second characteristic coefficient is smaller than or equal to the preset duration parameter; and judging a result that the application can be cleaned up, when the second characteristic coefficient is greater than the preset duration parameter.

It should be noted that, a person of ordinary skill in the art may understand that all or part of the operations in the various methods of the foregoing embodiments may be completed in a manner of instructing related hardware via programs, wherein the programs may be stored in a computer-readable storage medium. The storage medium may include, but is not limited to, a read-only memory (ROM, Read Only Memory), a random access memory (RAM, Random Access Memory), a magnetic disk, an optical disk, or the like.

The application management method and device, storage medium, and electronic apparatus provided in the embodiments of the present disclosure have been described in detail above. Specific examples have been applied in the present disclosure to explain the principles and implementing manners of the present application. The description of the above embodiments is merely intended to facilitate understanding the method and core idea of the present disclosure. Meanwhile, those skilled in the art may make variations in actual implementing manners and application scope in light of the idea of the present disclosure. In sum, contents of the present description shall not be construed as limiting the present disclosure.

What is claimed is:

1. A method of application management, comprising:
   collecting a plurality of characteristic information of an application according to an operation record of the application;
   learning the plurality of characteristic information through a self-organizing neural network to obtain a self-organizing neural network model of the application, the self-organizing neural network model comprising a characteristic coefficient matrix of the application;
   calculating a first characteristic coefficient of the application according to current characteristic information of the application, when the application runs in a background;
   determining a second characteristic coefficient from the characteristic coefficient matrix according to the first characteristic coefficient; and
   judging whether the application can be cleaned up according to the second characteristic coefficient.

2. The method according to claim 1, wherein the characteristic coefficient matrix comprises a plurality of characteristic coefficients, and the operation of determining the second characteristic coefficient from the characteristic coefficient matrix according to the first characteristic coefficient comprises:
   calculating absolute values of differences between the first characteristic coefficient and the plurality of characteristic coefficients, respectively; and
   determining, as the second characteristic coefficient, a characteristic coefficient corresponding to a difference with a minimum absolute value.

3. The method according to claim 1, wherein the operation of judging whether the application can be cleaned up according to the second characteristic coefficient comprises:
   acquiring a preset duration parameter;

comparing the second characteristic coefficient with the preset duration parameter to obtain a comparison result; and judging whether the application can be cleaned up according to the comparison result.

4. The method according to claim 3, wherein the operation of acquiring the preset duration parameter comprises:

determining time corresponding to the second characteristic coefficient according to the second characteristic coefficient; and acquiring the preset duration parameter according to a time period in which the time lies and a preset correspondence relationship, the preset correspondence relationship being a correspondence relationship between the time period and the preset duration parameter.

5. The method according to claim 3, wherein the operation of judging whether the application can be cleaned up according to the comparison result comprises:

judging a result that the application cannot be cleaned up, when the second characteristic coefficient is smaller than or equal to the preset duration parameter; and judging a result that the application can be cleaned up, when the second characteristic coefficient is greater than the preset duration parameter.

6. The method according to claim 1, wherein the operation of learning the plurality of characteristic information through the self-organizing neural network to obtain the self-organizing neural network model of the application comprises:

calculating a plurality of characteristic coefficients of the application according to the plurality of characteristic information collected and connection weights of individual nodes in the self-organizing neural network; and acquiring the self-organizing neural network model of the application according to the plurality of characteristic coefficients obtained.

7. The method according to claim 6, wherein during the calculating the plurality of characteristic coefficients of the application according to the plurality of characteristic information collected and the connection weights of individual nodes in the self-organizing neural network, calculation is performed according to the following formula:

$$W(t)=W(t-1)+\Theta(t-1)L(t-1)(I(t-1)-W(t-1)),$$

wherein W(t) is a connection weight of a node at time t, and is also a characteristic coefficient calculated; t represents time at which the calculation is performed; W(t−1) is a connection weight of the node at time t−1; $\Theta$(t−1) is a rate of change of domain radius at the time t−1; L(t−1) is a learning rate at the time t−1; and I(t−1) is characteristic information input to an input node of the self-organizing neural network at the time t−1.

8. A non-transitory storage medium, storing a computer program, which, when running on a computer, causes the computer to execute the following operations:

collecting a plurality of characteristic information of an application according to an operation record of the application;

learning the plurality of characteristic information through a self-organizing neural network to obtain a self-organizing neural network model of the application, the self-organizing neural network model comprising a characteristic coefficient matrix of the application;

calculating a first characteristic coefficient of the application according to current characteristic information of the application, when the application runs in a background;

determining a second characteristic coefficient from the characteristic coefficient matrix according to the first characteristic coefficient; and judging whether the application can be cleaned up according to the second characteristic coefficient.

9. The non-transitory storage medium according to claim 8, wherein the characteristic coefficient matrix comprises a plurality of characteristic coefficients, and the operation of determining the second characteristic coefficient from the characteristic coefficient matrix according to the first characteristic coefficient comprises:

calculating absolute values of differences between the first characteristic coefficient and the plurality of characteristic coefficients, respectively; and determining, as the second characteristic coefficient, a characteristic coefficient corresponding to a difference with a minimum absolute value.

10. The non-transitory storage medium according to claim 8, wherein the operation of judging whether the application can be cleaned up according to the second characteristic coefficient comprises:

acquiring a preset duration parameter;

comparing the second characteristic coefficient with the preset duration parameter to obtain a comparison result; and judging whether the application can be cleaned up according to the comparison result.

11. The non-transitory storage medium according to claim 10, wherein the operation of acquiring the preset duration parameter comprises:

determining time corresponding to the second characteristic coefficient according to the second characteristic coefficient; and acquiring the preset duration parameter according to a time period in which the time lies and a preset correspondence relationship, the preset correspondence relationship being a correspondence relationship between the time period and the preset duration parameter.

12. The non-transitory storage medium according to claim 10, wherein the operation of judging whether the application can be cleaned up according to the comparison result comprises:

judging a result that the application cannot be cleaned up, when the second characteristic coefficient is smaller than or equal to the preset duration parameter; and judging a result that the application can be cleaned up, when the second characteristic coefficient is greater than the preset duration parameter.

13. The non-transitory storage medium according to claim 8, wherein the operation of learning the plurality of characteristic information through the self-organizing neural network to obtain the self-organizing neural network model of the application comprises:

calculating a plurality of characteristic coefficients of the application according to the plurality of characteristic information collected and connection weights of individual nodes in the self-organizing neural network; and acquiring the self-organizing neural network model of the application according to the plurality of characteristic coefficients obtained.

14. An electronic apparatus, comprising a processor and a memory, wherein the memory stores a computer program, and the processor executes the following operations by calling the computer program stored in the memory:

collecting a plurality of characteristic information of an application according to an operation record of the application;

learning the plurality of characteristic information through a self-organizing neural network to obtain a self-organizing neural network model of the application, the self-organizing neural network model comprising a characteristic coefficient matrix of the application;

calculating a first characteristic coefficient of the application according to current characteristic information of the application, when the application runs in a background;

determining a second characteristic coefficient from the characteristic coefficient matrix according to the first characteristic coefficient; and judging whether the application can be cleaned up according to the second characteristic coefficient.

15. The electronic apparatus according to claim 14, wherein the characteristic coefficient matrix comprises a plurality of characteristic coefficients, and during the determining the second characteristic coefficient from the characteristic coefficient matrix according to the first characteristic coefficient, the processor is configured to execute the following operations:

calculating absolute values of differences between the first characteristic coefficient and the plurality of characteristic coefficients, respectively; and determining, as the second characteristic coefficient, a characteristic coefficient corresponding to a difference with a minimum absolute value.

16. The electronic apparatus according to claim 14, wherein during the judging whether the application can be cleaned up according to the second characteristic coefficient, the processor is configured to execute the following operations:

acquiring a preset duration parameter;

comparing the second characteristic coefficient with the preset duration parameter to obtain a comparison result; and judging whether the application can be cleaned up according to the comparison result.

17. The electronic apparatus according to claim 16, wherein during the acquiring the preset duration parameter, the processor is configured to execute the following operations:

determining time corresponding to the second characteristic coefficient according to the second characteristic coefficient; and acquiring a preset duration parameter according to a time period in which the time lies and a preset correspondence relationship, the preset correspondence relationship being a correspondence relationship between the time period and the preset duration parameter.

18. The electronic apparatus according to claim 16, wherein during the judging whether the application can be cleaned up according to the comparison result, the processor is configured to execute the following operations:

judging a result that the application cannot be cleaned up, when the second characteristic coefficient is smaller than or equal to the preset duration parameter; and judging a result that the application can be cleaned up, when the second characteristic coefficient is greater than the preset duration parameter.

19. The electronic apparatus according to claim 14, wherein during the learning the plurality of characteristic information through the self-organizing neural network to obtain the self-organizing neural network model of the application, the processor is configured to execute the following operations:

calculating a plurality of characteristic coefficients of the application according to the plurality of characteristic information collected and connection weights of individual nodes in the self-organizing neural network; and acquiring the self-organizing neural network model of the application according to the plurality of characteristic coefficients obtained.

20. The electronic apparatus according to claim 19, wherein during the calculating the plurality of characteristic coefficients of the application according to the plurality of characteristic information collected and the connection weights of individual nodes in the self-organizing neural network, the processor is configured to perform calculation according to the following formula:

$$W(t)=W(t-1)+\Theta(t-1)L(t-1)(I(t-1)-W(t-1)),$$

where $W(t)$ is a connection weight of a node at time t, and is also a characteristic coefficient calculated; t represents time at which the calculation is performed; $W(t-1)$ is a connection weight of the node at time $t-1$; $\Theta(t-1)$ is a rate of change of domain radius at the time $t-1$; $L(t-1)$ is a learning rate at the time $t-1$; and $I(t-1)$ is characteristic information input to an input node in the self-organizing neural network at the time $t-1$.

* * * * *